(12) United States Patent
Tsuji

(10) Patent No.: US 7,548,498 B2
(45) Date of Patent: *Jun. 16, 2009

(54) OPTICAL DISK UNIT CAPABLE OF READING OUT DATA NORMALLY AND CONTINUOUSLY AFTER SUSPENSION OF DATA WRITING

(75) Inventor: Masaaki Tsuji, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/582,267

(22) Filed: Oct. 17, 2006

(65) Prior Publication Data

US 2007/0036045 A1 Feb. 15, 2007

Related U.S. Application Data

(63) Continuation of application No. 10/282,396, filed on Oct. 29, 2002, now Pat. No. 7,151,732.

(30) Foreign Application Priority Data

Oct. 30, 2001 (JP) .............................. 2001-332287

(51) Int. Cl.
G11B 7/0045 (2006.01)
(52) U.S. Cl. ................................. 369/53.12; 369/47.33
(58) Field of Classification Search ....................... None
See application file for complete search history.

(56) References Cited

U.S. PATENT DOCUMENTS

| | | | | |
|---|---|---|---|---|
| 5,214,626 A | * | 5/1993 | Satoh et al. | 369/30.23 |
| 5,295,124 A | * | 3/1994 | Shirako | 369/47.11 |
| 5,313,443 A | * | 5/1994 | Iitsuka | 369/47.24 |
| 5,323,367 A | * | 6/1994 | Tamura et al. | 369/30.36 |
| 5,341,356 A | * | 8/1994 | Dieleman et al. | 369/47.54 |
| 5,420,838 A | * | 5/1995 | Maeda et al. | 369/30.09 |
| 5,504,728 A | | 4/1996 | Yokota et al. | |
| 5,563,861 A | * | 10/1996 | Kudo et al. | 369/53.12 |
| 5,623,470 A | | 4/1997 | Asthana et al. | |
| 5,734,787 A | * | 3/1998 | Yonemitsu et al. | 386/111 |

(Continued)

FOREIGN PATENT DOCUMENTS

JP    1049990    2/1998

(Continued)

*Primary Examiner*—Andrea L Wellington
*Assistant Examiner*—Michael V Battaglia
(74) *Attorney, Agent, or Firm*—Cooper & Dunham, LLP

(57) ABSTRACT

An optical disk unit includes the following: a storage part temporarily storing data to be written to an optical disk; a processing part processing the data; an encoder part modulating and outputting the processed data; a writing control part controlling writing of the data to the optical disk; and a writing command part detecting an occurrence of a state of suspension of supply of the data to the storage part and providing an operation command to the writing control part in accordance with the detection result. In the case of suspending the writing of the data to the optical disk, the writing control part causes the processing and encoder parts to stop accessing the storage part by setting the processing and encoder parts in a wait state after the processing and encoder parts access the storage part, and causes the storing of the data in the storage part to be stopped.

16 Claims, 12 Drawing Sheets

U.S. PATENT DOCUMENTS

| | | | |
|---|---|---|---|
| 5,742,579 A * | 4/1998 | Kazuno et al. | 369/124.07 |
| 5,848,050 A * | 12/1998 | Nagasawa et al. | 369/275.4 |
| 6,198,707 B1 | 3/2001 | Yamamoto | |
| 6,282,159 B1 * | 8/2001 | Kimura | 369/47.14 |
| 6,404,714 B1 | 6/2002 | Choi | |
| 6,754,144 B1 * | 6/2004 | Fushimi et al. | 369/44.25 |
| 6,930,964 B2 | 8/2005 | Matsui | |
| 6,975,573 B2 | 12/2005 | Yamamoto | |
| 7,151,732 B2 * | 12/2006 | Tsuji | 369/53.31 |
| 2001/0006496 A1 * | 7/2001 | Hayashi et al. | 369/47.32 |
| 2002/0075778 A1 * | 6/2002 | Banno | 369/47.48 |
| 2002/0110061 A1 | 8/2002 | Tsuji | |
| 2002/0136121 A1 * | 9/2002 | Salmonsen et al. | 369/47.53 |

FOREIGN PATENT DOCUMENTS

| | | |
|---|---|---|
| JP | 11-167721 | 6/1999 |
| JP | 2002-298496 | 10/2002 |

* cited by examiner

OPTICAL DISK UNIT CAPABLE OF READING OUT DATA NORMALLY AND CONTINUOUSLY AFTER SUSPENSION OF DATA WRITING

CROSS-REFERENCE TO RELATED APPLICATION

This application is a Rule 1.53(b) Continuation of U.S. Ser. No. 10/282,396, filed Oct. 29, 2002, now U.S. Pat. No. 7,151,732 the entire contents of which are incorporated by reference herein.

BACKGROUND OF THE INVENTION

1. Field of the Invention

The present invention relates to optical disk units, and more particularly to an optical disk unit for recording information on and reproducing information from DRAW-type (DRAW: Direct Read After Write) optical disks such as CD-R, CD-RW, DVD-R, DVD-RW, and DVD+RW disks.

2. Description of the Related Art

Data recording on DRAW-type optical disks such as CD-R, CD-RW, DVD-R, DVD-RW, and DVD+RW disks should be completed in a single writing operation. A writing method for such a writing operation is called "Track at Once" or "Disk at Once." If data is written to an optical disk at a higher rate than that at which the data is transferred from a host computer, thus resulting in data shortage in the middle of the writing operation, that is, if buffer under run occurs in the middle of the writing operation, the writing operation to the optical disk results in failure.

The buffer under run is more likely to occur as the data writing rate becomes higher. Once the buffer under run occurs, it may cause fatal damage to a recording medium that is not rewritable, such as a CD-R disk. Conventionally, the occurrence of buffer under run is avoided by increasing the capacity of a buffer RAM (formed of, for instance, a DRAM) or making the data writing rate lower than the data transfer rate.

Japanese Laid-Open Patent Application No. 10-49990 discloses a technology not for avoiding the occurrence of buffer under run but for coping with the buffer under run by suspending data writing to an optical disk temporarily and restarting the data writing after a sufficient amount of data is transferred from a host computer to be stored in a buffer RAM in the case of the occurrence of buffer under run. Thereby, the data writing can be completed normally without failure even in the case of the occurrence of buffer under run, which could otherwise be fatal to the data writing.

According to the recording control disclosed in the above-described patent application, data recording on the optical disk may be suspended and restarted frequently. Normally, data is transferred from the host computer to be stored temporarily in the buffer RAM, so that a predetermined parity is encoded and added to the data. Thereafter, the data is subjected to cross-interleave Reed-Solomon code (CIRC) coding and eight to fourteen modulation (EFM) to be recorded on the optical disk as recording data. At present, the buffer RAMs for the conventional optical disk units range from 5 Kbytes to 8 Mbytes in capacity.

On the other hand, the recording rate for the CDs, for instance, which is 150 Kbytes per second at normal speed, is as high as 2.4 Mbytes per second at 16× speed. Therefore, with the recording rate becoming higher at the current pace, all of the data temporarily stored in the buffer RAM is recorded on the optical disk in a very short period of time. That is, if there is no transfer of new data from the host computer to the buffer RAM during this limited period of time, the buffer under run occurs so that the recording operation is suspended. Although the host computer connected to the optical disk unit boasts better performance, the optical disk unit should be prepared for frequent suspension and restarting of its recording operation so as to ensure stable operation to any host computer.

Under the condition where the recording operation is frequently suspended and restarted, however, if the recording operation is controlled so that recording is restarted precisely from a position at which the recording was previously ended or suspended by detecting the position, and if there is a difference between absolute position information and the position of the recorded data on the optical disk, the difference accumulates to exceed a certain amount so that the recording may be prevented from being restarted. That is, as previously described, the maximum amount of data that is transferred from the host computer in a single transmission and can be stored in the buffer RAM is equivalent to the capacity of the buffer RAM. Thus, the recording operation should be suspended if there is no new data transfer from the host computer before recording of the data stored in the buffer RAM is completed. The possibility of the occurrence of this problem increases as the buffer RAM is reduced in capacity and/or the rate of recording data on the optical disk increases.

SUMMARY OF THE INVENTION

Accordingly, it is a general object of the present invention to provide an optical disk unit in which the above-described disadvantage is eliminated.

A more specific object of the present invention is to provide an optical disk unit that can read out data normally and continuously from an optical disk, like data written thereto at a time without any interruption, even if the data writing is suspended and restarted from a position where the data writing is suspended.

The above objects of the present invention are achieved by an optical disk unit for recording information on and reproducing information from an optical disk on which address information indicating a position of a part unrecorded with data is written. The optical disk unit includes the following: a storage part temporarily storing data transferred from outside to be written to the optical disk so that predetermined processing is performed on the data; a processing part performing the predetermined processing on the data; an encoder part modulating, by a predetermined method, and outputting the data processed in the processing part; a writing control part controlling writing of the data to the optical disk by controlling the processing part and the encoder part and controlling storing of the data in the storage part; and a writing command part detecting an occurrence of a state of suspension of supply of the data to the storage part and providing an operation command to the writing control part in accordance with a result of the detection, wherein the writing control part, in the case of suspending the writing of the data to the optical disk, causes the processing part and the encoder part to stop accessing the storage part by setting the processing part and the encoder part in a wait state after the processing part and the encoder part access the storage part, and causes the storing of the data in the storage part to be stopped.

According to the above-described optical disk unit, in the case of suspending data writing to the optical disk, the processing part and the encoder part are prevented from accessing the storage part after being set in a wait state after accessing the storage part, and storing of the data to be written to the optical disk is suspended. Therefore, interleaving can be controlled, and disturbance in a DSV operation can be prevented. Accordingly, the data can be read out from the optical disk just as data written thereto continuously without any interruption even if the data writing is restarted after being suspended.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of embodiments of the present invention.

First Embodiment

Figure 1:
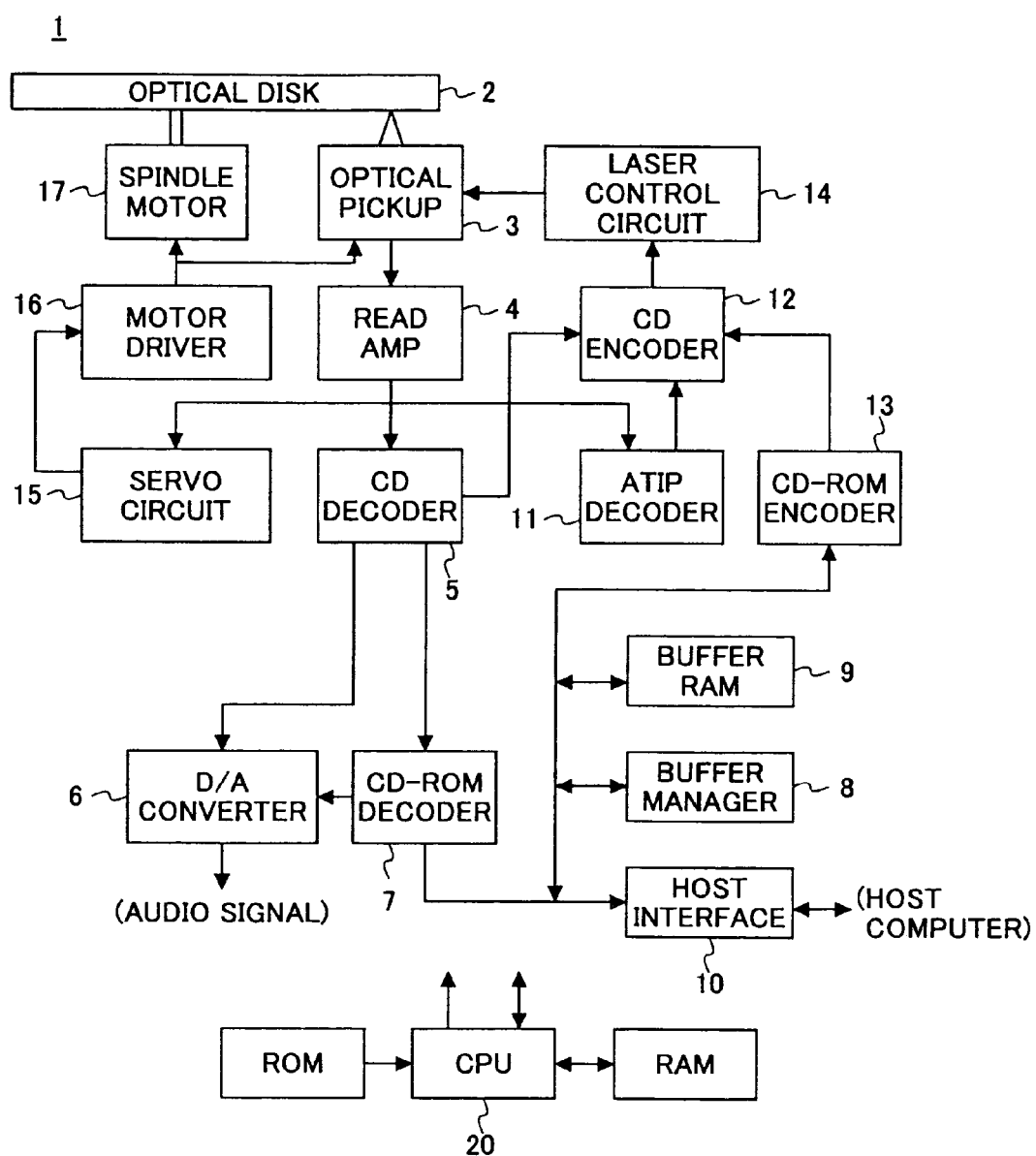
FIG. 1 is a block diagram showing a configuration of an optical disk unit according to a first embodiment of the present invention.

FIG. 1 is a block diagram showing a configuration of an optical disk unit 1 according to a first embodiment of the present invention. In the following description, a sync (synchronization) pattern is abbreviated as a sync.

The optical disk unit 1 includes an optical pickup 3 that reads data from and writes data to an optical disk 2, which is a CD-R disk in this embodiment, by emitting a laser beam onto the optical disk 2. The optical pickup 3 includes a semiconductor laser emitting the laser beam, an optical system, a focus actuator, a tracking actuator, a light-receiving element, and a position sensor, which are not shown in the drawing.

A data signal read from the optical disk 2 by the optical pickup 3 is amplified to be converted into a binary form (binarized) by a read amplifier 4. A CD decoder 5 decodes the data amplified and binarized in the read amplifier 4 by performing EFM demodulation and operations based on CIRC, such as deinterleaving and error correction. If the decoded data is music data (hereinafter referred to as CD data), the decoded data is subjected to digital-to-analog (D/A) conversion in a D/A converter 6 to be output as an audio signal.

The CD decoder 5 also outputs the decoded CD data and personal computer data (hereinafter referred to as CD-ROM data) to a CD-ROM decoder 7. The CD-ROM decoder 7 stores the input data in a buffer RAM 9 via a buffer manager 8 whenever necessary, and performs error correction on the stored data in order to increase its reliability. Reading the stored data from the buffer RAM 9 and returning the error-corrected data to the buffer RAM 9 are also performed via the buffer manager 8 in the case of error correction.

The data error-corrected by the CD-ROM decoder 7 is read out via the buffer manager 8 to be transferred to an external host computer HC through a host interface 10. The host interface 10, which provides interface with the host computer HC, is based on a standard such as ATAPI (Advanced Technology Attachment Packet Interface) or SCSI (Small Computer System Interface).

ATIP (Absolute Time In Pregroove) data is recorded on the optical disk 2 in the manufacturing process thereof. When data is written to an unrecorded part of the optical disk 2, the optical pickup 3 reads out the ATIP data. That is, the optical pickup 3 reads out a wobble signal from the optical disk 2, and the wobble signal is amplified and binarized in the read amplifier 4 to be output to an ATIP decoder 11.

The ATIP decoder 11 generates a synchronization signal (hereinafter referred to as an ATIP sync), time information (hereinafter referred to as ATIP time information), and the CRC (cyclic redundancy check) operation result of the ATIP data (hereinafter referred to as an ACRC result) from the input ATIP data, and outputs the ATIP sync, the ATIP time information, and the ACRC result to a CD encoder 12. In writing data to the unrecorded part of the optical disk 2, the CD encoder 12 uses the input ATIP data as important information for detecting a writing position on the optical disk 2. The ATIP sync and the ATIP time information enable the CD encoder 12 to start writing at an accurate position on the optical disk 2.

Thus, in the unrecorded part of the optical disk 2, time information indicating a position on the optical disk 2 can be obtained only from the ATIP data. On the other hand, in the recorded part of the optical disk 2, the wobble signal is inferior in quality so as to prevent the ATIP decoder 11 from generating the ATIP sync and the ATIP time information with accuracy. However, subcode data as well as a subcode sync forming a synchronization signal is recorded on the recorded part of the optical disk 2. The CD decoder 5 processes the subcode data and outputs time information on the optical disk 2 to the CD encoder 12. Thus, the CD encoder 12 obtains the time information indicating a position on the optical disk 2 by using the subcode data in the case of writing data to the recorded part of the optical disk 2.

Data to be written to the optical disk 2 is transferred from the host computer HC to the buffer RAM 9 via the buffer manager 8. A CD-ROM encoder 13 reads data from the buffer RAM 9 via the buffer manager 8, adds an error-correcting code, an EDC (Error-Detecting Code), a SYNC code, and header information to the read data, and writes back the data to the buffer RAM 9.

The CD-ROM encoder 13 also reads prepared data from the buffer RAM 9 via the buffer manager 8, and writes the read-out data to a CIRC operation RAM part 31 (will be later described) of the CD encoder 12. The CD encoder 12 performs CIRC operations on the data in the CIRC operation RAM part 31, adding an error-correcting code to and interleaving the data. After the CIRC operations, the CD encoder 12 EFM-modulates and outputs the data. The output data of the CD encoder 12 is recorded on the optical disk 2 via a laser control circuit 14 and the optical pickup 3.

The wobble signal obtained from the optical disk 2 is input to a servo circuit 15 via the optical pickup 3 and the read amplifier 4, and a rotation control signal generated in the servo circuit 15 is supplied to a motor driver 16 to a spindle motor 17. The CD decoder 5, the CD-ROM decoder 7, the host interface 10, the ATIP decoder 11, the CD encoder 12, and the CD-ROM encoder 13 are controlled by a CPU 20.

Figure 2:
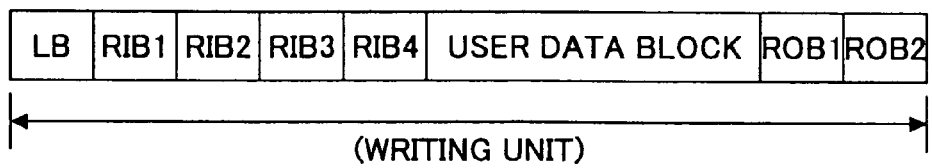
FIG. 2 is a diagram showing the format of a unit of data writing of CD-R or CD-RW defined in the Orange Book.

FIG. 2 is a diagram showing the format of a unit of data writing (data writing unit) of CD-R or CD-RW defined in the Orange Book ("Recordable CD Standard," a specifications book written by the Sony and Philips Corporations, published in 1990). Normally, due to deinterleaving and synchronization establishment at the time of reproducing data recorded on the optical disk 2, the data cannot be read out completely from a user data block only by writing the data thereto. Therefore, the user data block is protected by the preceding five and the succeeding two redundancy blocks so as to ensure that the data is read out.

The five preceding blocks to the user data block are composed of a link block LB and the first through fourth run-in blocks RIB1 through RIB4. The two succeeding blocks to the user data block are composed of the first and second run-out blocks ROB1 and ROB2.

Figure 3:
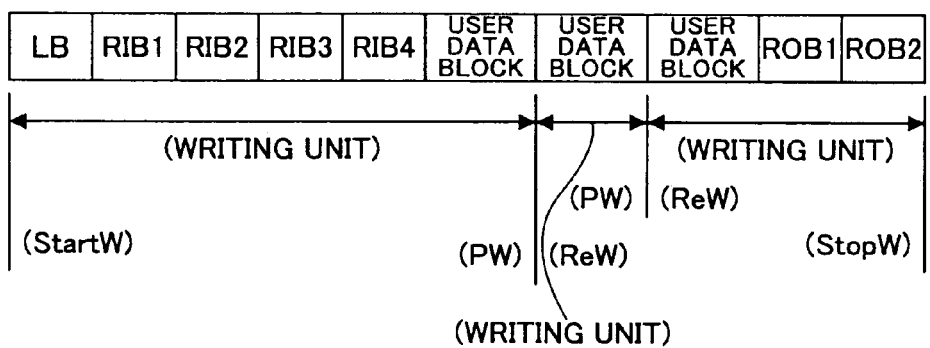
FIG. 3 is a diagram showing a format in the case of writing the data shown in FIG. 2 in a plurality of times.

FIG. 3 is a diagram showing a format in the case of writing the data shown in FIG. 2 in a plurality of times. In FIG. 3, at the time of writing the data, the CD encoder 12 executes a "Start Write (StartW)" command when the data is received from the host computer HC to be stored in the buffer RAM 9.

Further, when the data is running short in the buffer RAM 9 after the CD encoder 12 starts writing the data to the optical disk 2, so that buffer under run is likely to occur, the CD encoder 12 executes a "Pause Write (PW)" command to suspend (stop temporarily) the data writing to the optical disk 2. Thereafter, the CD encoder 12 waits for data transfer from the host computer HC, and when the buffer RAM 9 is filled with the transferred data, the CD encoder 12 executes a "Restart Write (ReW)" command. At this point, the CD encoder 12 detects the position at which the data writing is suspended by PW, and restarts the data writing at that position and continues the data writing.

Thus, the CD encoder 12 suspends data writing by PW when data is running short in the buffer RAM 9, and restarts the data writing by ReW when the buffer RAM 9 is filled with new data. The CD encoder 12 repeats this suspension and restarting of data writing an appropriate number of times. When all of the writing data (data to be written) transferred from the host computer HC is written to the optical disk 2, the CD encoder 12 finally executes a "Stop Write (StopW)" command to complete the data writing. By the above-described data processing, the data shown in FIG. 2 can be written in a plurality of times as shown in FIG. 3 as if written in a single writing operation.

Here, a description will be given of the operation flow of the writing control operations of the components of the optical disk unit 1 shown in FIG. 1.

First, the CPU 20 issues the StartW command so that the CD encoder 12 starts data writing to the optical disk 2. Next, the buffer manger 8 receives data transferred from the host computer HC. The received data is stored in the buffer RAM 9, and the CPU 20 checks and determines, by a predetermined method, whether the data stored in the buffer RAM 9 is reduced to a predetermined amount.

If the data stored in the buffer RAM 9 is not reduced to the predetermined amount, the CPU 20 determines, based on predetermined firmware, whether the data writing to the optical disk 2 is completed. If the data writing to the optical disk 2 is completed, the CPU 20 issues the StopW command to the CD encoder 12 so as to terminate the data writing operation. If the data writing to the optical disk 2 is not completed, the CD encoder 12 continues the data writing to the optical disk 2.

On the other hand, if the CPU 20 determines that the data stored in the buffer RAM 9 is reduced to the predetermined amount, the CPU 20 issues the PW command to the CD encoder 12 so as to suspend the data writing to the optical disk 2. Next, the buffer manager 8 receives data transferred from the host computer HC. The received data is stored in the buffer RAM 9. The CPU 20 checks and determines, by a predetermined method, whether the data stored in the buffer RAM 9 has increased to a predetermined amount.

If the CPU 20 determines that the predetermined amount of data is stored in the buffer RAM 9, the CPU 20 issues the ReW command to the CD encoder 12 so as to restart the data writing to the optical disk 2, while the buffer manager 8 receives data transferred from the host computer HC and stores the received data in the buffer RAM 9. If the CPU 20 determines that the predetermined amount of data is not yet stored in the buffer RAM 9, the buffer manager 8 continues receiving data transferred from the host computer HC and storing the received data in the buffer RAM 9.

Thus, receiving a WRITE command and a certain amount of data from the host computer HC, the CPU 20 issues the StartW command to start data writing. The StartW command is a normal write sequence starting from a link block, and the data writing to the optical disk 2 and data transfer from the host computer HC are repeated for a predetermined length. If the rate of data transfer from the host computer HC is lower than the rate of data writing to the optical disk 2 during the data writing, the data stored in the buffer RAM 9 is reduced so as to prevent the data writing from being continued.

Therefore, when the CPU 20 detects a decrease in the amount of data stored in the buffer RAM 9 and determines that the amount of data transferred from the host computer HC is not enough to compensate for the decrease, the CPU 20 issues the PW command to suspend the data writing. Suspension of data writing by the PW command is a write sequence that temporarily stops data writing without writing run-out blocks.

Thereafter, when a sufficient amount of data is received from the host computer HC and stored in the buffer RAM 9, the CPU 20 issues the ReW command. Data writing by the ReW command is a write sequence in which, unlike in the normal write sequence, no data is written to the link block. Instead, the data writing is restarted exactly at the end of the data already written by the time of the suspension of the data writing. The data writing continues from that restarting point so that data continuity is maintained over the restarting point, which is positioned so that synchronization is maintained in the data writing. When predetermined data is written to the optical disk 2, the CPU 20 issues the StopW command. Completion of data writing by the StopW command is a normal write sequence in which run-out blocks are written.

As described above, the optical disk unit 1 monitors the amount of data stored in the buffer RAM 9 during the write sequence, and repeats the PW and ReW operations as required in order to prevent writing failure due to buffer under run. Thereby, when data transfer from the host computer HC does not catch up with data writing to the optical disk 2, the data writing is suspended temporarily, and is restarted when a sufficient amount of data has been transferred from the host computer. Therefore, even if data transfer from the host computer HC is temporarily stopped or the rate of data transfer is temporarily reduced, the data can be written normally to the optical disk 2 in a plurality of times so that writing failure can be avoided. Further, the capacity of the buffer RAM 9 absorbing the pulsations of data transfer can be reduced so that the optical disk unit 1 can be reduced in cost.

Figure 4:
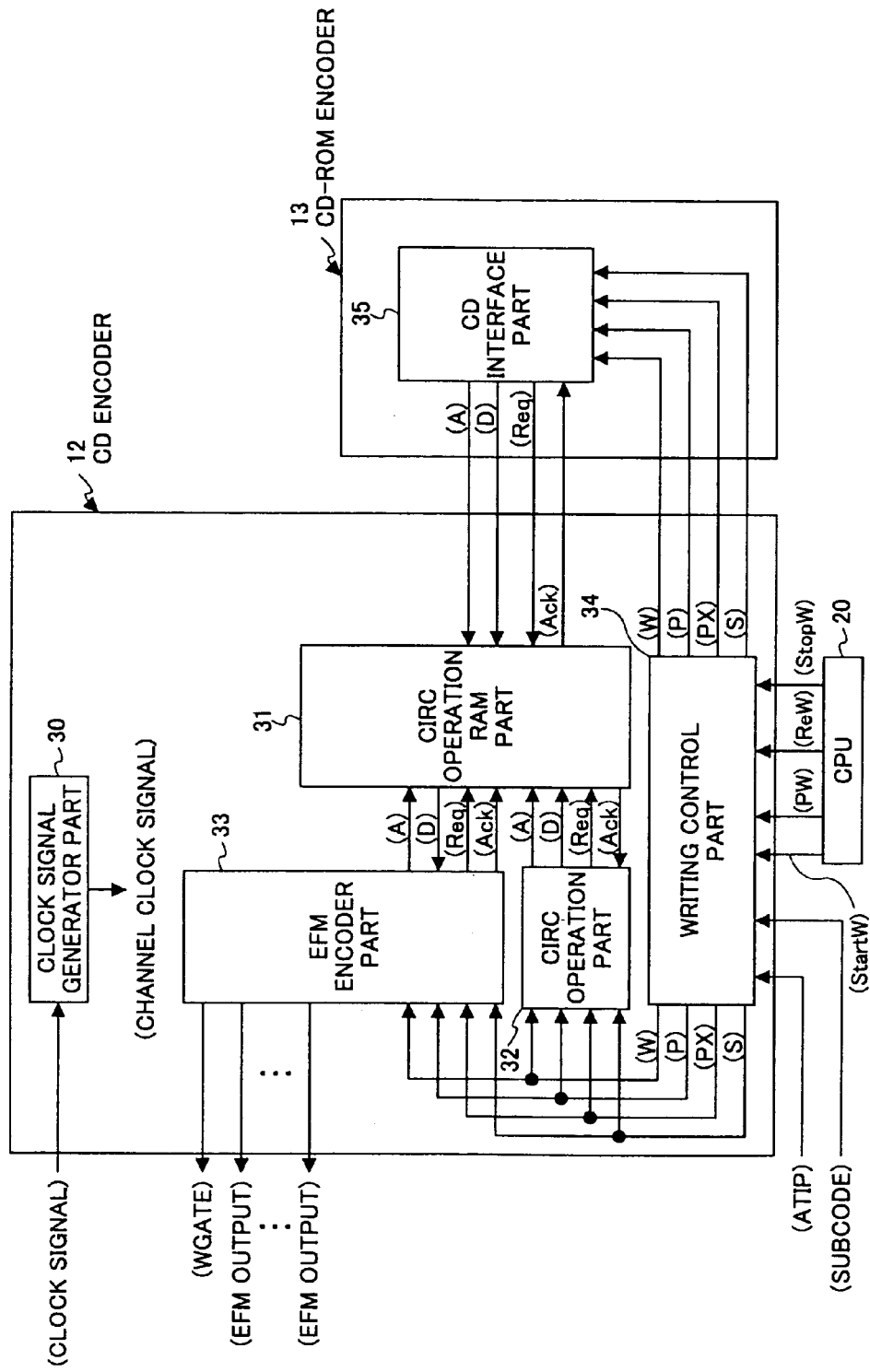
FIG. 4 is a block diagram showing a configuration of a CD encoder of the optical disk unit of FIG. 1 according to the first embodiment of the present invention.

Next, a description will be given in more detail, with reference to FIG. 4, of the operation of writing data to the optical disk 2 by the CD encoder 12. FIG. 4 is a block diagram showing a configuration of the CD encoder 12.

According to FIG. 4, the CD encoder 12 includes a clock signal generator part 30, the CIRC operation RAM part 31, a CIRC operation part 32, an EFM encoder part 33, and a writing control part 34. The clock signal generator part 30 is formed of a clock generator including a phase-locked loop (PLL) circuit.

The clock signal generator part 30 generates a channel clock signal that is a reference clock signal for writing required in the CD encoder 12 from, for instance, a clock signal of 33.8688 MHz input from a crystal oscillator (not shown in the drawing). The clock signal generator part 30 outputs the channel clock signal to each part of the CD encoder 12. The CIRC operation RAM part 31 temporarily stores writing data read out from the buffer RAM 9 by the CD-ROM encoder 13 in order to perform the CIRC operations.

The CIRC operation part 32 performs the CIRC operations on the data stored in the CIRC operation RAM part 31, adding the error-correcting code to and interleaving the data. The EFM encoder part 33 EFM-modulates the data processed in the CIRC operation part 32 based on a predetermined method, and outputs the EFM-modulated data to the laser control circuit 14. The writing control part 34, based on instructions from the CPU 20, generates and outputs writing control signals (for controlling data writing) to the CIRC operation part 32, the EFM encoder part 33, and a CD interface part 35 in the CD-ROM encoder 13. The CD interface part 35 of the CD-ROM encoder 13 establishes interface with the CD encoder 12.

Specifically, the writing control part 34 generates and outputs a predetermined write signal W and a predetermined pause signal P to the CIRC operation part 32, the EFM encoder part 33, and the CD interface part 35 when the CPU 20 inputs the StartW command and the PW command to the writing control part 34, respectively. Further, the writing control part 34 generates and outputs a predetermined pause cancellation signal PX and a predetermined stop signal S to the CIRC operation part 32, the EFM encoder part 33, and the CD interface part 35 when the CPU 20 inputs the ReW command and the StopW command to the writing control part 34, respectively. In FIG. 4, "A" indicates address data, "D" indicates data, "Req" indicates a request signal, and "Ack" indicates an acknowledge signal.

According to this configuration, when the CPU 20 outputs the PW command, the writing control part 34 causes the CIRC operation part 32, the EFM encoder part 33, and the CD interface part 35 to continue data writing up to a preset writing end EFM frame and suspend the data writing after the end of the EFM frame is written. When the data writing reaches the end of the EFM frame, the CIRC operation part 32, the EFM encoder part 33, and the CD interface part 35, which access the CIRC operation RAM part 31 in order to generate writing data, have completed the operations and reading required in the EFM frame. Therefore, the CIRC operation part 32, the EFM encoder part 33, and the CD interface part 35 are caused to wait in that state.

In this wait state, the operation of generating the address data, the data, the request signal, and the acknowledge signal is suspended between the CIRC operation RAM part 31 and each of the CIRC operation part 32, the EFM encoder part 33, and the CD interface part 35. Further, the EFM encoder part 33 stops outputting signals for writing, such as an EFM signal and a write gate signal WGATE. Since the outputting of the write gate signal WGATE is thus suspended, the data writing to the optical disk 2 is also suspended.

In the conventional optical disk unit, the occurrence of buffer under run causes data writing to the optical disk 2 to result in failure. This is partly because the same state as that before the occurrence of the buffer under run cannot be created at the time of restarting the data writing since interleaving is performed at the time of generating writing data in the CIRC operation part 32. Further, this is also because a DSV (Digital Sum Value) operation performed in the EFM encoder part 33 is disturbed at the time of restarting the data writing. According to the optical disk unit 1 of the present invention, receiving the PW command from the CPU 20, the writing control part 34 controls the CD-ROM encoder 13, the CIRC operation part 32, and the EFM encoder part 33 so that each of the CD-ROM encoder 13, the CIRC operation part 32, and the EFM encoder part 33 enters a wait state to stop accessing the CIRC operation RAM part 31 after completing the current access thereto and restarts its operation with the restart of the data writing. Thereby, interleaving in the CIRC operation part 32 is controlled. Further, by putting the EFM encoder part 33 in a wait state at the same time, the disturbance of the DSV operation can also be avoided.

Therefore, even if writing of data includes suspension and restarting, the written data can be read from the optical disk 2 as normally as data written continuously without any suspension.

In the above-described suspension state, when the CPU 20 outputs the ReW command, the writing control part 34 detects a writing restart position (at which the data writing is restarted) as will be described later, and outputs the pause cancellation signal PX to each of the CIRC operation part 32, the EFM encoder part 33, and the CD interface part 35 in a wait state by the pause signal P. Thereby, each of the CIRC operation part 32, the EFM encoder part 33, and the CD interface part 35 restarts its operation from where the operation is suspended, so that the EFM encoder part 33 restarts outputting the EFM signal and the write gate signal WGATE. By restarting outputting the write gate signal WGATE, the data writing to the optical disk 2 is restarted from the position at which the data writing is suspended (suspended position).

Thus, data is written to the optical disk 2 so that its continuity can be maintained between the suspended position and the restart position of the data writing. Therefore, the data can be read from the optical disk 2 with accuracy and continuity even if its writing operation included suspension and restarting.

Figure 5:
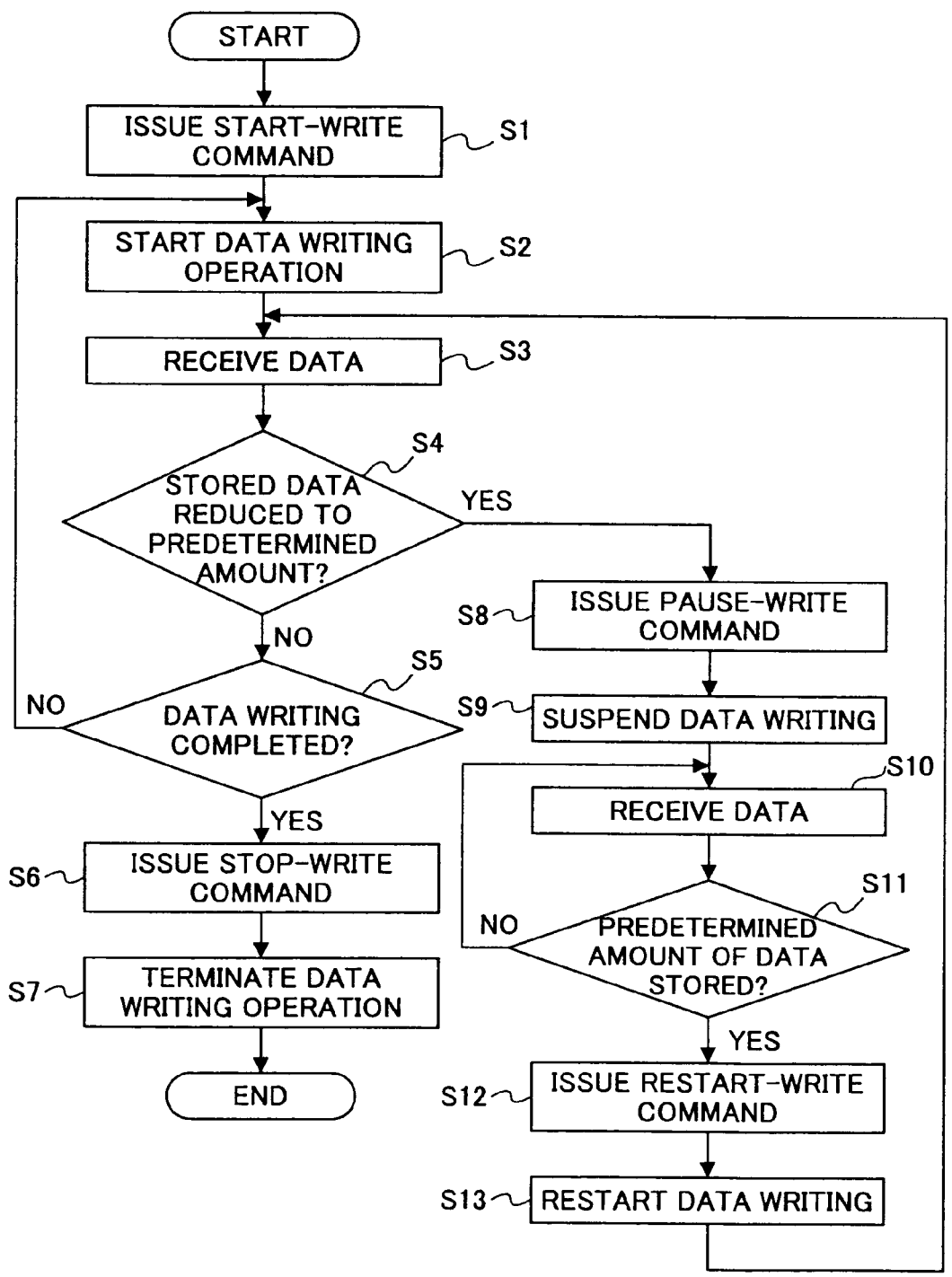
FIG. 5 is a flowchart of a writing control operation in the optical disk unit of FIG. 1.

FIG. 5 is a flowchart of the writing control operation in the optical disk unit 1 shown in FIGS. 1 through 4.

In step S1 of FIG. 5, the CPU 20 issues the StartW command to the writing control part 34. In step S2, the writing control part 34 outputs the predetermined write signal W to each of the CIRC operation part 32, the EFM encoder part 33, and the CD interface part 35 so as to start an operation of writing data to the optical disk 2. Next, in step S3, the buffer manager 8 receives data transferred from the host computer HC, and stores the received data in the buffer RAM 9. In step S4, the CPU 20 determines, by the predetermined method, whether the data stored in the buffer RAM 9 is reduced to the predetermined amount.

If the CPU 20 determines in step S4 that the stored data is not reduced to the predetermined amount (that is, "NO" in step S4), in step S5, the CPU 20 determines, based on the predetermined firmware, whether the data writing to the optical disk 2 is completed. If the CPU 20 determines in step S5 that the data writing is completed (that is, "YES" in step S5), in step S6, the CPU 20 issues the StopW signal to the writing control part 34. Then, in step S7, the writing control part 34 outputs the predetermined stop signal S to each of the CIRC operation part 32, the EFM encoder part 33, and the CD interface part 35 so as to terminate the data writing operation. If the data writing is not completed in step S5 (that is, "NO" in step S5), the operation returns to step S2.

If the CPU 20 determines in step S4 that the stored data is reduced to the predetermined amount (that is, "YES" in step S4), in step S8, the CPU 20 issues the PW command to the writing control part 34. Then, in step S9, the writing control part 34 outputs the predetermined pause signal P to each of the CIRC operation part 32, the EFM encoder part 33, and the CD interface part 35 so as to suspend the data writing to the optical disk 2. Next, in step S10, the buffer manager 8 receives data transferred from the host computer HC, and stores the received data in the buffer RAM 9. Then, in step S11, the CPU 20 determines, by the predetermined method, whether the buffer RAM 9 is filled with the transferred data, that is, whether the predetermined amount of data is stored in the buffer RAM 9.

If the CPU 20 determines in step S11 that the predetermined amount of data is stored in the buffer RAM 9 (that is, "YES" in step S11), in step S12, the CPU 20 issues the ReW command to the writing control part 34. In step S13, the writing control part 34 outputs the predetermined pause cancellation signal PX to each of the CIRC operation part 32, the EFM encoder part 33, and the CD interface part 35 so as to restart the data writing to the optical disk 2. Thereafter, the operation returns to step S3. If the CPU 20 determines in step S11 that the predetermined amount of data is not stored in the buffer RAM 9 (that is, "NO" in step S11), the operation returns to step S10 so that the data writing is continued.

Next, a description will be given of the writing restart position (a position at which data writing is restarted).

Figure 6:
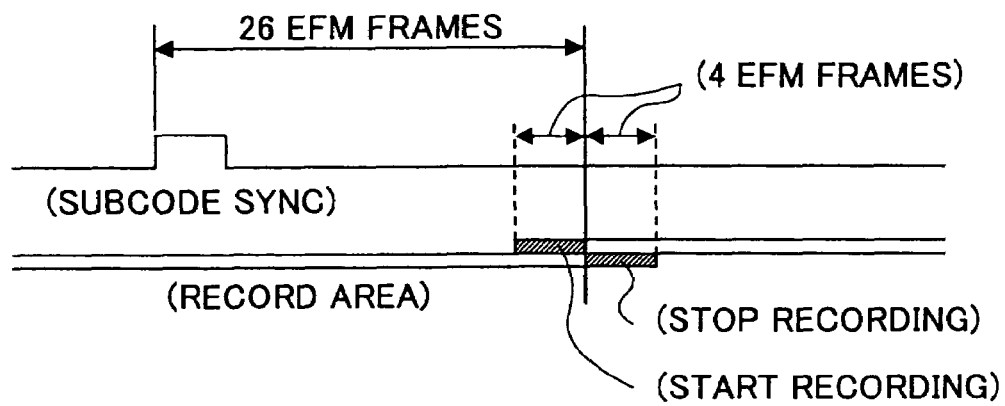
FIG. 6 is a diagram showing the relationship between starting and end positions in writing data to an optical disk, the relationship being defined in the Orange Book.

FIG. 6 is a diagram showing the relationship between starting and end positions in writing data to the optical disk 2, the relationship being defined in the Orange Book. As shown in FIG. 6, the Orange Book allows a considerably large overlap of four EFM frames of data. Such a large data overlap causes loss of frame synchronization and thus prevents normal data reproduction even in an optical disk unit for CDs having a high capability of error correction. Such a large allowable value, which is provided in order to absorb rotation control error in a spindle motor, is possible because the next writing start position is determined based on an ATIP sync demodulated from a wobble signal irrespective of already written data.

Figure 7:
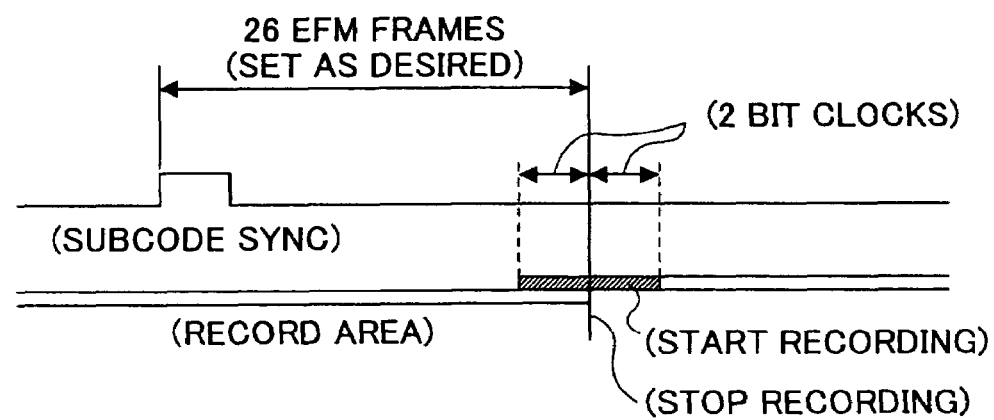
FIG. 7 is a diagram showing joining of data on the optical disk according to the first embodiment of the present invention.

In order to reproduce data without loss of synchronization at a joining part of data in data recording, a format as shown in FIG. 7 is employed considering the width of a frame synchronization protection window. That is, in order to write data so that the data can be reproduced without loss of synchronization, it is required to form a joining part of data in data recording with an error being restricted to the range of approximately ±2 bit clocks. It is difficult to determine a writing start position with such accuracy by controlling data writing based on the accuracy of rotation control of the spindle motor as in the conventional optical disk unit.

Therefore, in the optical disk unit 1 according to the first embodiment of the present invention, when the CPU 20 outputs the PW command, the writing control part 34 obtains and stores, in its built-in register, information on how many EFM frames has been written so far including the currently written EFM frame based on time information at that point and a subcode sync (S0 or S1) to be written, and completes writing of the currently written EFM frame until its end. Then, the writing control part 34 suspends the data writing. In the operation of restarting the data writing in which the CPU 20 outputs the ReW command, the CPU 20 reads out the position at which the data writing is suspended on the optical disk 2 from the register of the writing control part 34. The CPU 20 confirms the suspended position and performs a seek operation so as to locate a seek position, that is, a position preceding the suspended position in the direction of writing. Since the information indicating the suspended position is stored in the resister (suspended position information storage part) of the writing control part 34, the seek position and the restart position can be determined easily.

After the seek operation performed by the CPU 20, the writing control part 34 proceeds, based on the ATIP time information or subcode time information, to the time position at which the data writing was suspended, and waits for the subcode sync (S0 or S1). When the writing control part 34 detects the subcode sync, the writing control part 34 waits for n EFM frame sync counts, n being the number of EFM frames stored in the register at the time of suspending the data writing. At the time of suspending data writing, the writing control part 34 always suspends the data writing at a point at which a frame sync is written. Therefore, by restarting the data writing after waiting for the demodulation delay time of the frame sync from that point, data joining can be performed with accuracy on the optical disk 2.

By comparing the current position on the optical disk 2 and the suspended position information stored in the register of the writing control part 34 and automatically restarting the data writing when the current position matches the suspended position, a load on the CPU 20 can be reduced.

If data writing is not restarted normally because the suspended position stored in the register of the writing control part 34 cannot be detected, another seek operation is performed to retry to restart the data writing. In such a case, however, the data writing may be restarted with the suspended position detected in an unstable reading condition. Therefore, at the time of retrying data writing, the data writing can be prevented from being restarted in an unstable condition by detecting the suspended position after its reading condition is stabilized after the seek operation.

Figure 8:
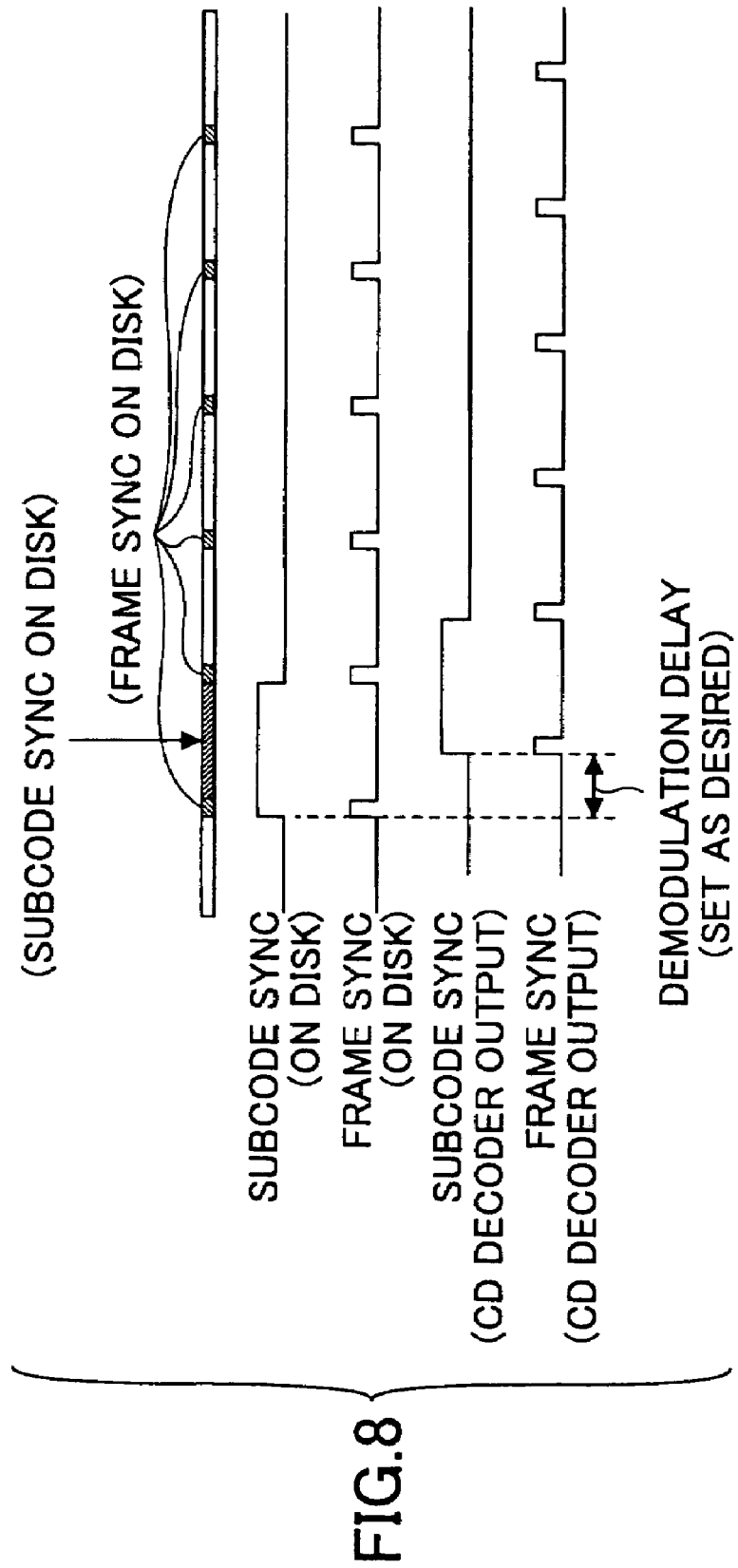
FIG. 8 is a diagram showing the relationship between a subcode sync and a frame sync on the optical disk and the relationship between the subcode sync and the frame sync after demodulation according to the first embodiment of the present invention.

FIG. 8 is a diagram showing the relationship between the subcode sync and the frame sync on the optical disk 2 and the relationship between the subcode sync and the frame sync after demodulation. The subcode and frame syncs shown in FIG. 8 are signals that can also be obtained in the case of using an inexpensive general-purpose LSI only for a CD decoding function. As shown in FIG. 8, a characteristic demodulation delay is generated in demodulating the subcode sync and the frame sync. In order to join data with accuracy on the optical disk 2 at the time of restarting data writing, the demodulation delay should be corrected. By enabling the writing control part 34 to set the amount of correction to any value, the demodulation can be corrected in any of an optical pickup unit and a decoder irrespective of the difference therebetween, so that the data writing can be restarted with accuracy.

On the other hand, in the case of writing data to an optical disk, in some cases, a pseudo writing operation for checking a series of operation (hereinafter this operation is referred to as a test write) is performed, instead of writing actual data, in order to check whether data writing can be terminated normally. Unlike in actual data writing, no data is written to the optical disk 2 in the test write. Therefore, when the operation of suspending and restarting data writing is performed at the time of the occurrence of buffer under run in the test write, the data writing cannot be restarted by detecting such data already written on the optical disk 2 as previously described. In this case, the data writing can be restarted normally with no data written on the optical disk 2, which may be a CD-R, CD-RW, DVD-R, DVD-RW, or DVD+RW optical disk, by starting the data writing in timing with the wobble signal recorded on the optical disk 2.

Figure 9:
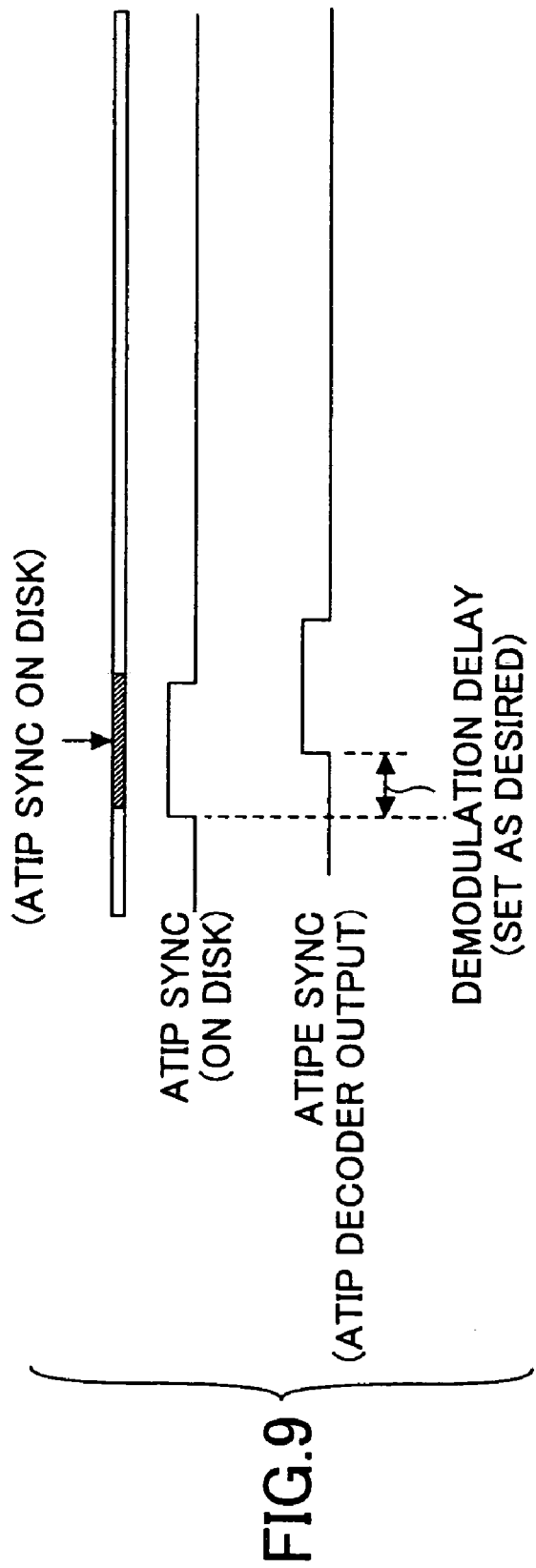
FIG. 9 is a diagram showing the relationship between an ATIP sync on the optical disk and the ATIP sync after demodulation according to the first embodiment of the present invention.

FIG. 9 is a diagram showing the relationship between the ATIP sync on the optical disk 2 and the ATIP sync after demodulation. As shown in FIG. 9, a characteristic demodulation delay is also generated in demodulating the wobble signal in the case of performing positioning (determining the restart position with respect to the suspended position) using the ATIP sync in the test write. In order to join data with accuracy on the optical disk 2 at the time of restarting data writing, the demodulation delay should be corrected. By enabling the writing control part 34 to set the amount of correction to any value, the demodulation can be corrected in any of an optical pickup unit and a decoder irrespective of the difference therebetween, so that the data writing can be restarted with accuracy.

Figure 10:
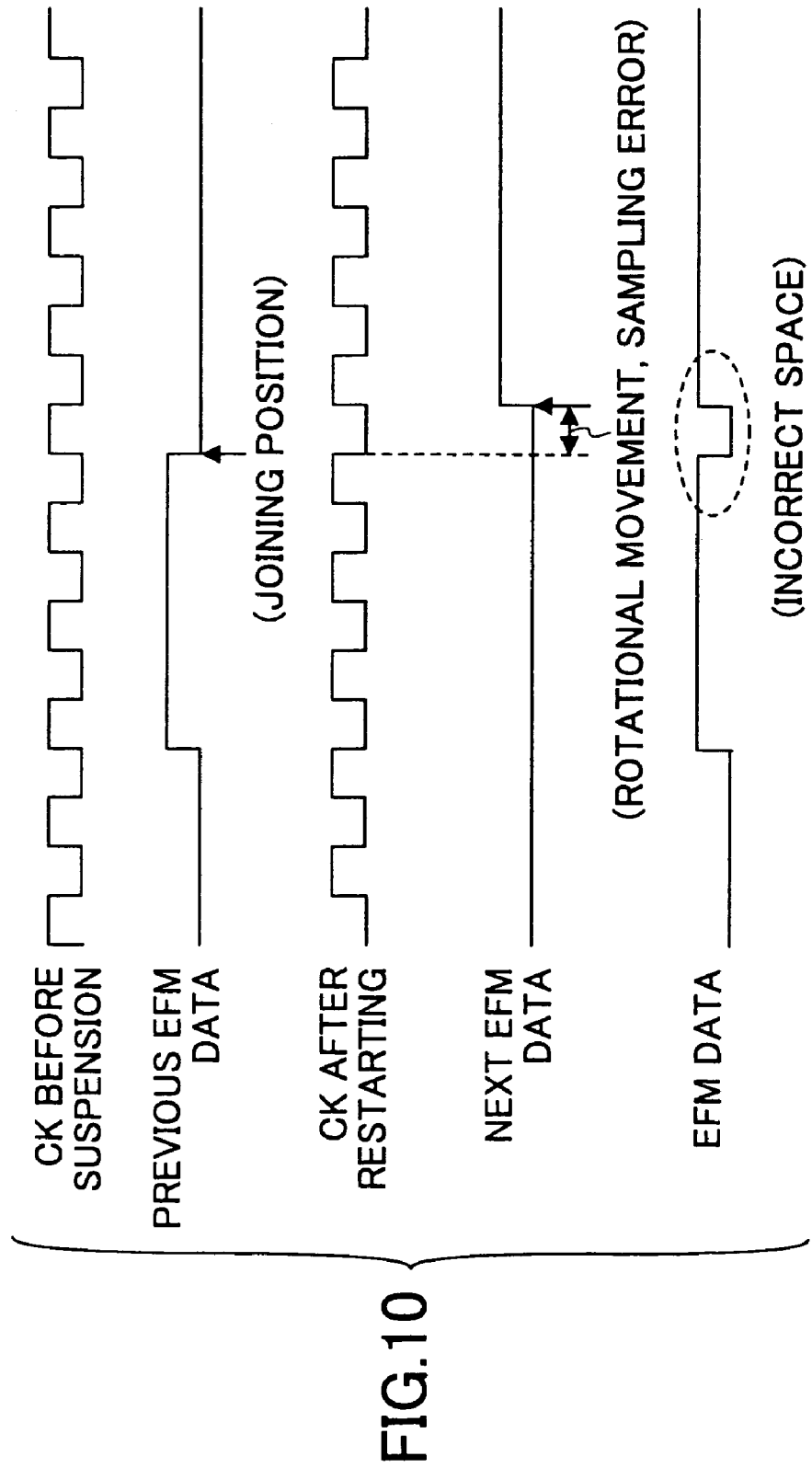
FIG. 10 is a diagram showing a data joining condition on the optical disk according to the first embodiment of the present invention.

Further, as shown in FIG. 10, if data written before suspension of data writing and data to be written after restarting of the data writing are both pits so that a gap is formed at the joining position (part) of the data by a positioning error at the time of restarting the data writing, a space corresponding to the gap is erroneously formed, that is, a pitless state is created. The PLL of the CD decoder 5 for data reading is also controlled by the maximum or minimum length of a pit or space determined by a standard. Therefore, if there is a space that does not meet the standard in length, the operation of the PLL may be disturbed. Therefore, by causing both of the previous and next data to be spaces, the above-described problem can be avoided even if the gap is formed at the data joining position.

Figure 11:
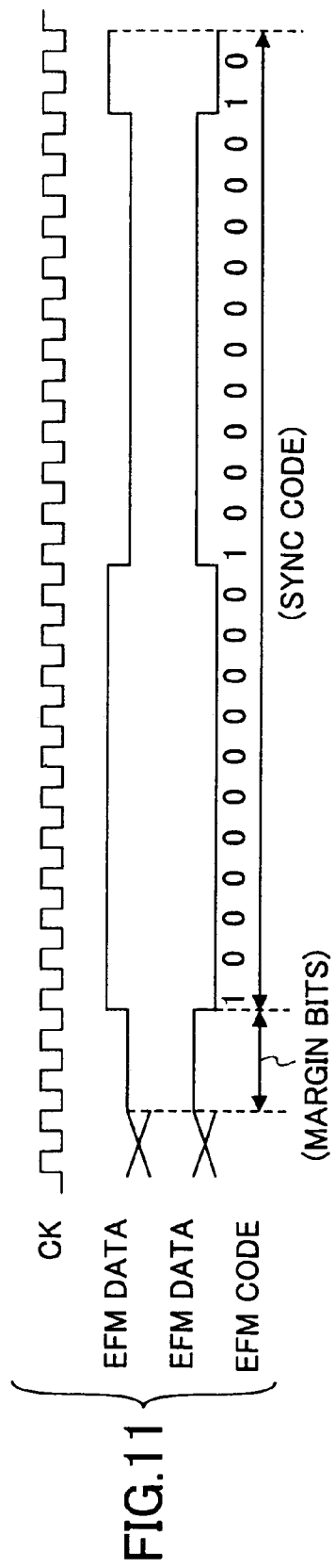
FIG. 11 is a diagram showing an EFM data recorded on the optical disk according to the first embodiment of the present invention.

Further, as shown in FIG. 11, two types of EFM data are generated from an EFM code as EFM data actually recorded on the optical disk 2. When margin bits start with a space and a sync code starts with a pit, data are connected by the margin bits. Therefore, even if the margin bits, which are normally predetermined as 3T in length as shown in FIG. 11 (T indicates one cycle of the clock signal CK), become longer than 3T due to a variation in the rotation of the spindle motor or loss of synchronization, the data can be read out normally if the sync pattern can be recognized by synchronization protection in the CD decoder 5. That is, both subcode data and main data can be read out without including errors. The clock signal CK in FIGS. 10 and 11 indicates the channel clock signal.

Generally, the CD decoder 5 performs synchronization protection on a sync part and error correction on a data part in consideration of reading failure at the time of reading out data. In light of such synchronization protection, it is also desirable to join data in the sync part. Further, with the function of joining data in a space in the sync pattern as described above, positioning error in data writing can be eliminated using the synchronization protection function of the CD decoder 5.

The above description is given of the case where data is written to an optical disk by CLV (Constant Linear Velocity) control. Since the CLV control is performed, there arise the above-described problems of what to do with the gap formed at a data joining position and how to join data. Thus, in the CLV control, which performs rotation control based on a write-system clock signal, error is caused in rotation control of the spindle motor due to the phase difference between a read-system clock signal and the write-system clock signal. Therefore, the CLV control may inevitably generate positioning error at a data joining position. Further, there is the problem that sampling error may occur even if a variation in the rotation of the optical disk due to the phase difference between the write-system clock signal and the read-system clock signal is minimized.

On the other hand, in CAV (Constant Angular Velocity) control where control is performed so that a PLL is "locked" to a wobble signal read from the optical disk in accordance with the rotation speed of the disk, the suspended position and the restart position of data writing can be determined based on the wobble signal. That is, since the CAV control is performed so that a reference clock signal for data writing is generated to have its phase locked to the wobble signal read out from the optical disk 2 in accordance with the rotation speed thereof, the suspended position and the restart position of data writing can be determined based on the wobble signal. Therefore, the positioning error generated at the data joining position in the CLV control can be reduced in the CAV control. Further, in the CAV control, the write-system clock signal follows the movement of the spindle motor. Therefore, a variation in the rotation of the optical disk can be totally ignored, and synchronization can be established between the write-system and the read-system. Accordingly, generation of sampling error can be controlled.

In the case of performing the CAV control, the clock signal of 33.8688 MHz input from the crystal oscillator to the clock signal generator part 30 of FIG. 4 is replaced by the binarized wobble signal supplied through the ATIP decoder 11. The clock signal generator 30 generates the channel clock signal from the input wobble signal, and outputs the channel clock signal to each part of the CD encoder 12.

Thus, in the optical disk unit 1 of the first embodiment, when the PW command is issued, the writing control part 34 obtains and stores, in its built-in register, information on how many EFM frames has been written so far including the currently written EFM frame based on time information at that point and a subcode sync to be written, and completes writing of the currently written EFM frame until its end. Then, the writing control part 34 suspends the data writing. When the ReW command is issued, the writing control part 34 proceeds, based on the ATIP time information or subcode time information, to the time position at which the data writing was suspended, and waits for the subcode sync. When the writing control part 34 detects the subcode sync, the writing control part 34 restarts the data writing from the position corresponding to the $n^{th}$ EFM frame sync count, n being the number of EFM frames stored in the register at the time of suspending the data writing. Thereby, data can be joined with accuracy on the optical disk 2 at the time of restarting data writing, so that at the time of suspending and restarting the data writing due to the occurrence of buffer under run, the data writing can be performed as if the data were written continuously.

Second Embodiment

In the first embodiment, if buffer under run occurs during data writing to the optical disk, the data writing is suspended temporarily, and is restarted after receiving data from the host computer. On the other hand, the wobble signal read out from the optical disk 2 may not be demodulated normally due to a track jump caused by impact on the optical disk unit and/or a flaw on the optical disk.

Therefore, in the optical disk unit 1 of the first embodiment, when a factor of emergency writing suspension, such as tracking error or spindle abnormality, is detected, data writing to the optical disk may be suspended, and be restarted after the suspension factor disappears, which is realized in a second embodiment of the present invention.

Figure 12:
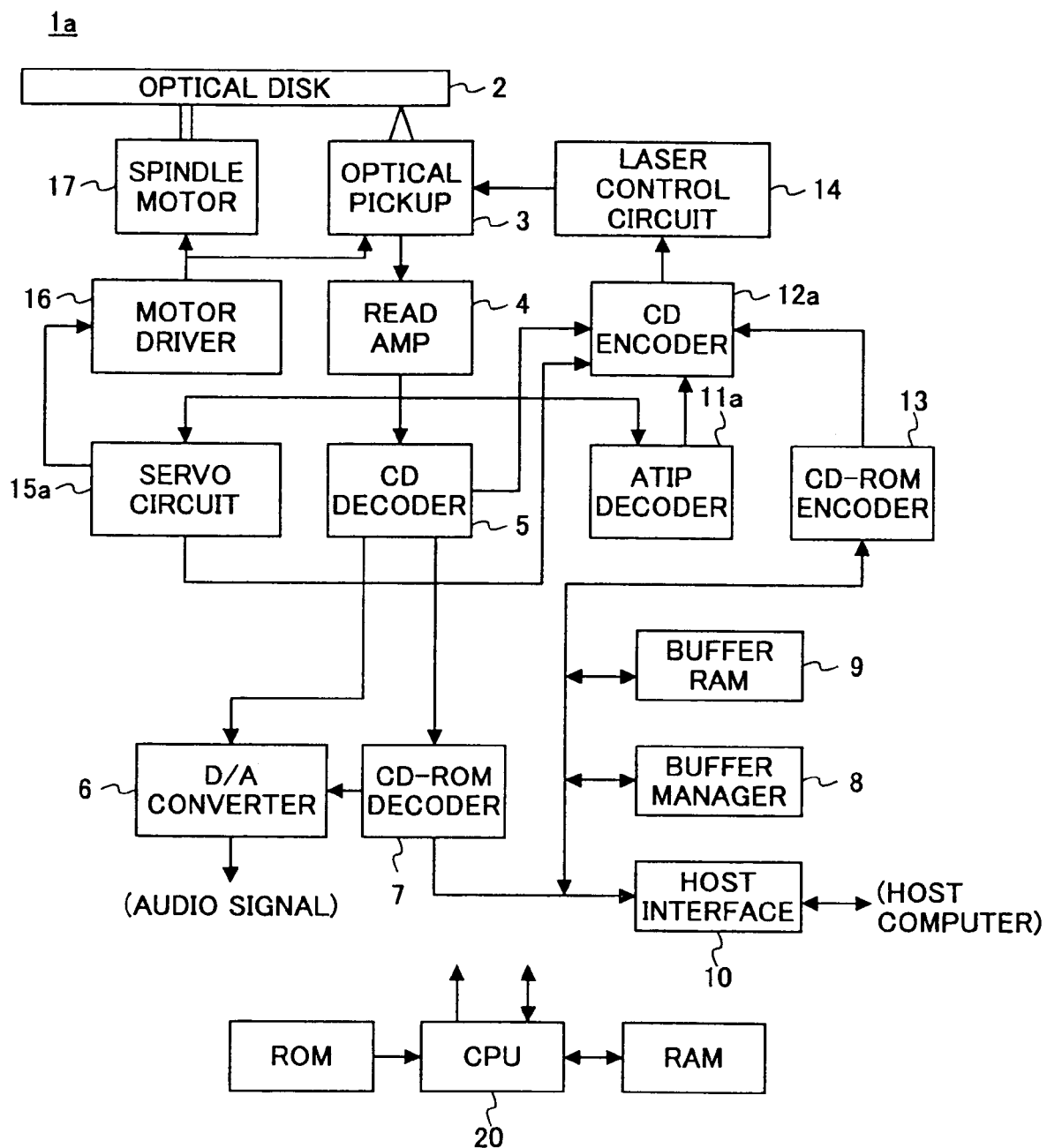
FIG. 12 is a block diagram showing a configuration of an optical disk unit according to a second embodiment of the present invention.

FIG. 12 is a block diagram showing a configuration of an optical disk unit 1a according to the second embodiment of the present invention. In FIG. 12, the same elements as those of FIG. 1 are referred to by the same numerals, and a description thereof will be omitted. Only the difference between the optical disk units 1 and 1a of FIGS. 1 and 12, respectively, will be described below. The optical disk 2 is a CD-R disk in this embodiment as well.

The optical disk unit 1a of FIG. 12 is different from the optical disk unit 1 of FIG. 1 in that when the wobble signal read out from the optical disk 2 cannot be demodulated normally due to tracking error or spindle abnormality, an ATIP decoder 11a and a servo circuit 15, which replace the ATIP decoder 11 and the servo circuit 15 of FIG. 1, respectively, outputs respective signals indicating the occurrence of abnormality (abnormality signals) to a CD encoder 12a, which replaces the CD encoder 12 of FIG. 1, so as to suspend data writing to the optical disk 2.

In FIG. 12, when the wobble signal is prevented from being demodulated normally due to a flaw on the optical disk 2 so that the servo circuit 15a is prevented from performing servo control normally, the servo circuit 15a outputs the abnormality signal to the CD encoder 12a. Then, the CD encoder 12a performs "Pause Write," the operation based on the PW command, immediately suspending data writing to the optical disk 2. At this point, the ATIP decoder 11a also outputs the abnormality signal to the CD encoder 12. However, the ATIP decoder 11a detects the occurrence of abnormality after reading the wobble signal to some extent, and outputs the abnormality signal to the CD encoder 12a. Therefore, the abnormality signal supplied from the servo circuit 15a is input to the CD encoder 12a earlier than the abnormality signal supplied from the ATIP decoder 11a.

On the other hand, if a track jump occurs due to impact, the CD encoder 12a detects abnormality in the input ATIP time information decoded in the ATIP decoder 11a. When the CD encoder 12a detects abnormality, the CD encoder 12a performs "Pause Write," immediately suspending data writing to the optical disk 2. At this point, the abnormality signal indicating servo abnormality is also input to the CD encoder 12a from the servo circuit 15a. However, the abnormality signal is input to the CD encoder 12a for a very short period of time. Therefore, the CD encoder 12a may not immediately suspend the data writing and perform "Pause Write" in response to the abnormality signal.

Figure 13:
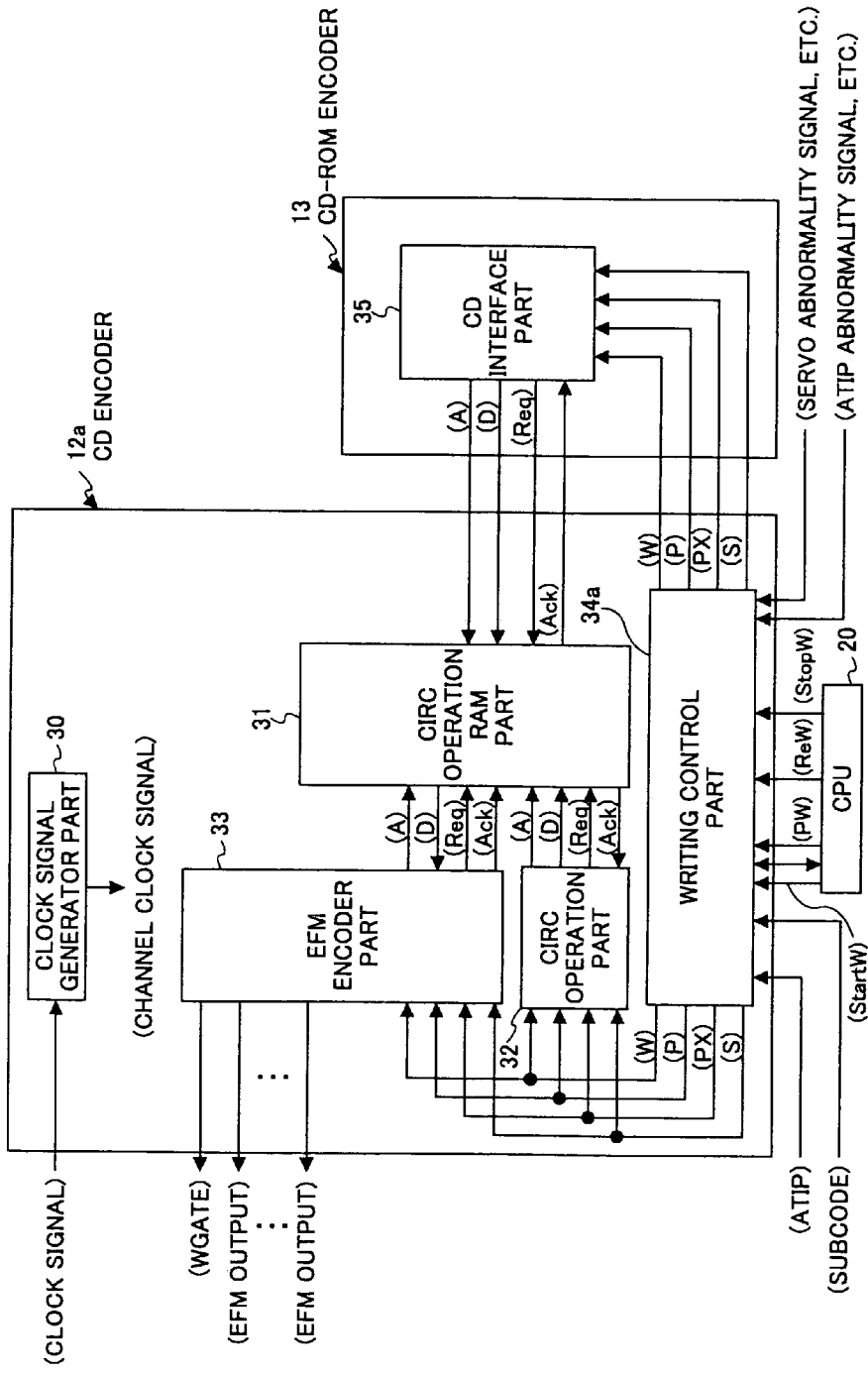
FIG. 13 is a block diagram showing a configuration of a CD encoder of the optical disk unit of FIG. 12.

FIG. 13 is a block diagram showing a configuration of the CD encoder 12a. In FIG. 13, the same elements as those of FIG. 4 are referred to by the same numerals, and a description thereof will be omitted. Only the difference between the CD encoders 12 and 12a of FIG. 4 and FIG. 13, respectively, will be described below.

In FIG. 13, the CD encoder 12a includes the clock signal generator part 30, the CIRC operation RAM part 31, the CIRC operation part 32, the EFM encoder part 33, and a writing control part 34a.

When the writing control part 34a detects a factor of emergency writing suspension, such as tracking error or spindle abnormality, from the ATIP time information and the ATIP abnormality signal input from the ATIP decoder 11a or the servo abnormality signal input from the servo circuit 15a, the writing control part 34a performs "Pause Write" as described in the first embodiment and suspends data writing. At this point, the writing control part 34a performs the same operation as the writing control part 34 of the first embodiment performs when the CPU 20 issues the PW command. Further, the writing control part 34a writes a status indicating the suspension of the data writing to its built-in register (not shown in the drawing). The CPU 20 reads the status written to the register by the writing control part 34a and recognizes "Pause Write" performed by the writing control part 34a.

Further, when the writing control part 34a determines, from the ATIP time information and the ATIP abnormality signal input from the ATIP decoder 11a or the servo abnormality signal input from the servo circuit 15a, that the factor of emergency writing suspension has disappeared, the writing control part 34a writes a status indicating the disappearance of the factor to its built-in register. The CPU 20 reads the status written to the register by the writing control part 34a, and recognizes the disappearance of the factor of emergency writing suspension, outputting the ReW command to the writing control part 34a.

Then, the writing control part 34a performs the same operation as the writing control part 34 of the first embodiment performs when the CPU 20 outputs the ReW command. Except for the above-described operations, the same operations as performed in the ATIP decoder 11, the servo circuit 15, and the writing control part 34 are performed in the ATIP decoder 11a, the servo circuit 15a, and the writing control part 34a, and a description thereof will be omitted.

The following cases are considered as factors of emergency suspension of data writing to the optical disk 2. If the continuity of the ATIP time information input from the ATIP decoder 11a is broken, that is, if complementary data and demodulated data are compared and the demodulated data does not match the complementary data although its ACRC result is OK, the writing control part 34a considers that the data continuity is broken, and performs "Pause Write." Further, when the number of consecutive times the ACRC result is determined to be NG exceeds a predetermined allowable value, the writing control part 34a performs "Pause Write."

When the ATIP sync to be detected cannot be detected, the ATIP decoder 11a interpolates the ATIP sync. When the number of interpolations exceeds an allowable value, the ATIP decoder 11a outputs a predetermined ATIP abnormality signal to the writing control part 34a. When the ATIP abnormality signal is input to the writing control part 34a, the writing control part 34a performs "Pause Write." The ATIP sync is defined so that the offset between the ATIP sync and the subcode sync to be written to the optical disk 2 is smaller than or equal to a specified value. If the offset exceeds the specified value, the writing control part 34a performs "Pause Write." Specifically, the writing control part 34a performs "Pause Write" if the ATIP sync cannot be detected within a window showing the ±2 EFM frames defined in the Orange Book.

On the other hand, when the phase comparison result of spindle servo exceeds an allowable value, the servo circuit 15a outputs a predetermined servo abnormality signal to the writing control part 34a, so that the writing control part 34a performs "Pause Write." Further, the servo circuit 15a detects impact on a part driving the optical disk 2. When the servo circuit 15a detects impact, the servo circuit 15a outputs a predetermined signal to the writing control part 34a, so that the writing control part 34a performs "Pause Write."

Figure 14:
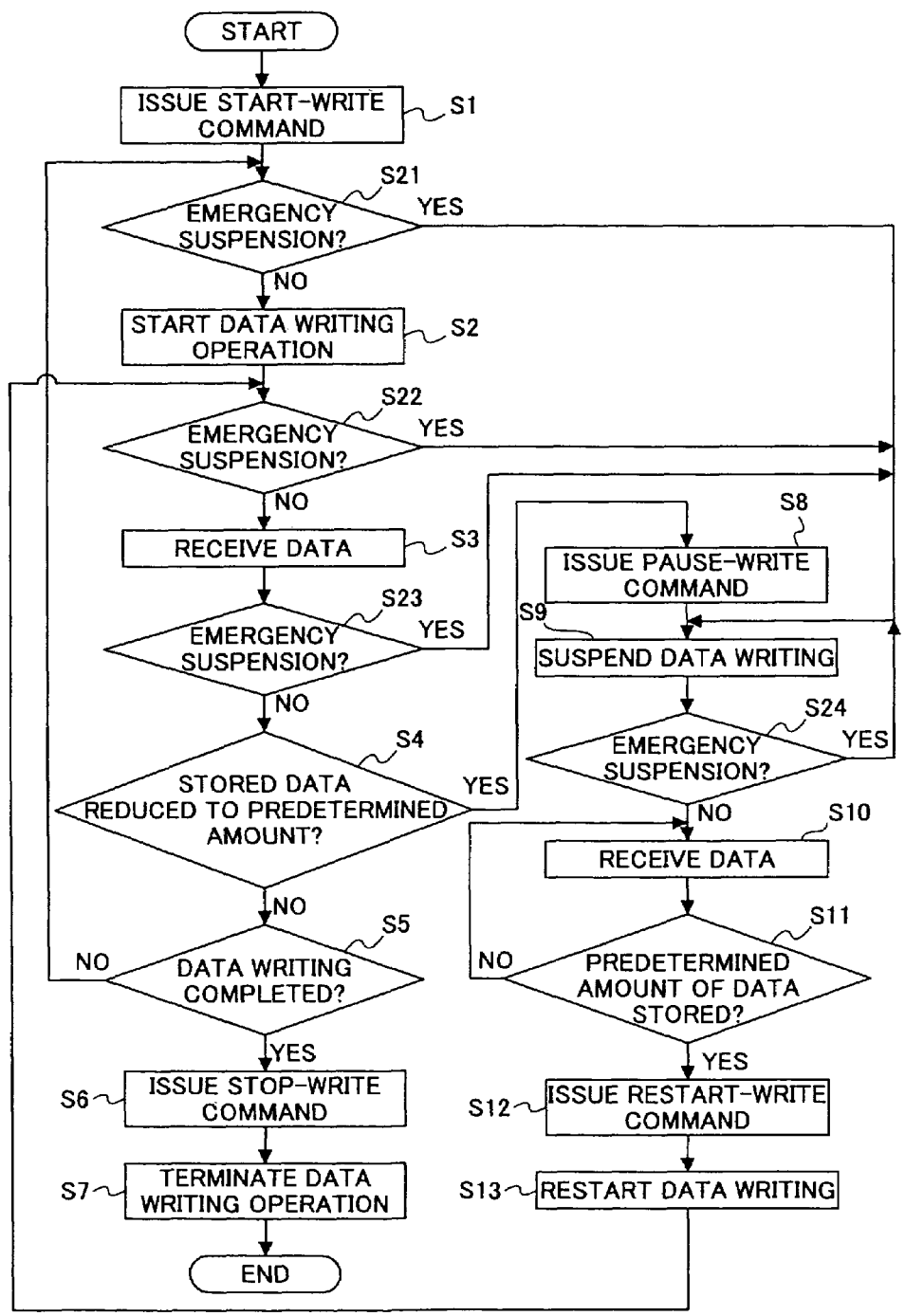
FIG. 14 is a flowchart of a writing control operation in the optical disk of FIG. 12 according to the second embodiment of the present invention.

FIG. 14 is a flowchart of the writing control operation in the optical disk 1a shown in FIGS. 12 and 13. In FIG. 14, the same steps as those of FIG. 5 are referred to by the same numerals (although the writing control part 34 of the first embodiment should be replaced by the writing control part 34a of the second embodiment), and a description thereof will be omitted. Only the difference between the operations of FIGS. 5 and 14 will be described below.

The operation of FIG. 14 is different from that of FIG. 5 in that step S21 is provided between steps S1 and S2 of FIG. 5, step S22 is provided between steps S2 and S3 of FIG. 5, step S23 is provided between step S3 and S4 of FIG. 5, and step S24 is provided between steps S9 and S10 of FIG. 5.

In FIG. 14, after performing step S1 (of FIG. 5), in step S21, the writing control part 34a determines, from signals input from the ATIP decoder 11a and the servo circuit 15a, whether there is the occurrence of a factor of emergency writing suspension, such as tracking error or spindle abnormality. If the writing control part 34a determines in step S21 that there is the occurrence of a factor of emergency writing suspension (that is, "YES" in step S21), step S9 is performed. If the writing control part 34a determines in step S21 that there is no occurrence of a factor of emergency writing suspension (that is, "NO" in step S21), step S2 is performed. Thereafter, in step S22, the writing control part 34a again determines, from signals input from the ATIP decoder 11a and the servo circuit 15a, whether there is the occurrence of a factor of emergency writing suspension, such as tracking error or spindle abnormality.

If the writing control part 34a determines in step S22 that there is the occurrence of a factor of emergency writing suspension (that is, "YES" in step S22), step S9 is performed. If the writing control part 34a determines in step S22 that there is no occurrence of a factor of emergency writing suspension (that is, "NO" in step S22), step S3 is performed. Thereafter, in step S23, the writing control part 34a again determines, from signals input from the ATIP decoder 11a and the servo circuit 15a, whether there is the occurrence of a factor of emergency writing suspension, such as tracking error or spindle abnormality.

If the writing control part 34a determines in step S23 that there is the occurrence of a factor of emergency writing suspension (that is, "YES" in step S23), step S9 is performed. If the writing control part 34a determines in step S23 that there is no occurrence of a factor of emergency writing suspension (that is, "NO" in step S23), steps S4 through S7 are performed, and the operation ends. If the data writing is not completed in step S5 (that is, "NO" in step S5), the operation returns to step S21.

After performing step S9, in step S24, the writing control part 34a determines, from signals input from the ATIP decoder 11a and the servo circuit 15a, whether there is the occurrence of a factor of emergency writing suspension, such as tracking error or spindle abnormality. If the writing control part 34a determines in step S24 that there is the occurrence of a factor of emergency writing suspension (that is, "YES" in step S24), step S9 is performed. If the writing control part 34a determines in step S24 that there is no occurrence of a factor of emergency writing suspension (that is, "NO" in step S24), steps S10 through S13 are performed, and thereafter, the operation returns to step S22.

Thus, in the optical disk unit 1a of the second embodiment, when a factor of emergency writing suspension, such as tracking error or spindle abnormality, is detected from the ATIP time information and the ATIP abnormality signal input from the ATIP decoder 11a or the servo abnormality signal input from the servo circuit 15a, "Pause Write" as described in the first embodiment is performed to suspend data writing, and "Restart Write" (the operation based on the ReW command) as described in the first embodiment is performed to restart the data writing from the suspended position when the suspension factor disappears. Therefore, data writing to the optical disk 2 can be performed normally without any failure even if suspension of the data writing is urgently required due to spindle abnormality or tracking error during the data writing.

The present invention is not limited to the specifically disclosed embodiments, but variations and modifications may be made without departing from the scope of the present invention.

The present application is based on Japanese priority application No. 2001-332287 filed on Oct. 30, 2001, the entire contents of which are hereby incorporated by reference.

What is claimed is:

1. An optical disk unit configured to write information onto an optical disk, comprising:

a storage part;

a motor configured to rotate the optical disk;

an optical pickup configured to write data onto the optical disk during rotation thereof by emitting light onto the optical disk; and an encoding part configured to generate and output the data to the optical pickup, the encoding part including a control part and a clock signal generator part, wherein the data is written as frames onto the optical disk, and upon detecting an abnormality during the writing of the information by the optical pickup, the control part stores identification of a current frame in the storage part and controls the optical pickup to continue writing to an end of the current frame, and when writing to the end of the current frame is completed, suspends the writing of the data by the optical pickup, and upon detecting disappearance of the abnormality, retrieves the identification of the current frame from the storage part and restarts the writing of the data at the end of the current frame as identified by the retrieved identification by joining the data so that the data are continuously readable from the optical disk at a time of reproducing the data, wherein the identification of the current frame stored in the storage part includes information indicating a number of frames written up to then, including the current frame, based on time information at that point and a subcode sync to be written, wherein the clock signal generator part is configured to generate a write-system clock signal based on a wobble signal read from the optical disk and input to the clock signal generator part through an ATIP decoder, and to output the write-system clock signal as a system clock signal inside the encoding part, wherein the motor rotates the optical disk by constant angular velocity control, the write-system clock signal follows a movement of the motor, the write-system clock signal is generated based on a wobble signal read from the optical disk, and the constant angular velocity control is performed so that a PLL is locked to the wobble signal.

2. The optical disk unit as claimed in claim 1, further comprising:

a decoder configured to detect absolute time on the optical disk from a signal read out by the optical pickup, wherein the abnormality is disruption of continuity of the absolute time detected by the decoder.

3. The optical disk unit as claimed in claim 1, further comprising:

a decoder configured to detect a synchronization signal on the optical disk from a signal read out by the optical pickup unit, wherein the abnormality is a failure of the decoder to detect the synchronization signal.

4. The optical disk unit as claimed in claim 1, further comprising:

a servo circuit configured to control rotation of the motor and movement of the optical pickup, wherein the abnormality is a failure of the servo circuit to control at least one of the motor and the optical pickup.

5. The optical disk unit as claimed in claim 1, further comprising:

a memory configured to store temporarily the data to be written onto the optical disk, wherein the storage of the data into the memory is stopped at a time of the suspension of the writing of the data.

6. The optical disk unit as claimed in claim 5, wherein a CIRC operation is performed on the data stored in the memory.

7. The optical disk unit as claimed in claim 1, further comprising:

a decoder configured to decode the data written onto the optical disk, wherein the data are connected over a position at which the writing of the data has been suspended and a position at which the writing of the data is to be restarted, so that a synch pattern is recognizable by synchronization protection by the decoder.

8. The optical disk unit as claimed in claim 7, wherein the data are connected with margin bits so that the sync pattern is recognizable by the synchronization protection by the decoder.

9. The optical disk unit as claimed in claim 1, wherein the optical disk is one of a CD-R, a CD-RW, a DVD-R, a DVD-RW, and a DVD+RW.

10. The optical disk unit as claimed in claim 1, wherein a position at which the writing of the data is restarted is determined based on a wobble signal read from the optical disk.

11. The optical disk unit as claimed in claim 1, wherein an error of a joining part of the data is approximately ±2 bit clocks.

12. The optical disk unit as claimed in claim 1, wherein the data include a space where the writing of the data is suspended and where the writing of the data is restarted.

13. The optical disk unit as claimed in claim 1, wherein a position at which the writing of the data has been suspended and a position at which the writing of the data is restarted are determined using the wobble signal.

14. The optical disk unit as claimed in claim 1, wherein the writing of the data by the optical pickup is suspended at a point at which a frame sync is written.

15. The optical disk unit as claimed in claim 14, wherein upon detecting disappearance of the abnormality, the control part controls the optical pickup to restart writing after waiting for a demodulation delay time of the frame sync.

16. The optical disc unit as claimed in claim 1, wherein only the identification of the current frame is used by the control part to determine the location at which writing is restarted.

* * * * *